United States Patent
Bishop et al.

(10) Patent No.: US 9,377,132 B2
(45) Date of Patent: Jun. 28, 2016

(54) ENCLOSURE HANGER ASSEMBLY AND CABLE MANAGEMENT SYSTEM

(71) Applicant: Tyco Electronics Corporation, Berwyn, PA (US)

(72) Inventors: Erik David Bishop, Fuquay-Varina, NC (US); Barry Wayne Allen, Siler City, NC (US); William B. Bryan, Fuquay-Varina, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/814,946

(22) Filed: Jul. 31, 2015

(65) Prior Publication Data

US 2016/0033056 A1 Feb. 4, 2016

Related U.S. Application Data

(60) Provisional application No. 62/031,244, filed on Jul. 31, 2014.

(51) Int. Cl.
*G02B 6/00* (2006.01)
*F16L 3/10* (2006.01)
*G02B 6/48* (2006.01)
*G02B 6/44* (2006.01)

(52) U.S. Cl.
CPC .............. *F16L 3/1075* (2013.01); *G02B 6/445* (2013.01); *G02B 6/483* (2013.01)

(58) Field of Classification Search
CPC ........................... G02B 6/4416; G02B 6/4439
USPC ............................................ 385/135; 248/61
See application file for complete search history.

(56) References Cited

U.S. PATENT DOCUMENTS

| 1,448,141 A | 3/1923 | Manz et al. |
| 2,252,820 A | 8/1941 | Tallman |

(Continued)

FOREIGN PATENT DOCUMENTS

| DE | 38 03 335 A1 | 8/1989 |
| EP | 2 128 505 A2 | 12/2009 |

OTHER PUBLICATIONS

"AIR FOSC, Aerial Fiber Optic Splice Closure," Tyco Electronics, 2005, 2 pp.

(Continued)

*Primary Examiner* — Ellen Kim
(74) *Attorney, Agent, or Firm* — Merchant & Gould P.C.

(57) ABSTRACT

A component is disclosed. In one aspect, the component can be adapted to be secured to an aerial strand which provides support for aerial cables. The component can include an aerial enclosure unit having a housing with first and second housing pieces. The first housing piece can be pivotally moveable relative to the second housing piece about a hinge pivot axis between an open configuration and a closed configuration. The housing having opposite minor sides that extend longitudinally between the first and second ends and opposite major sides that extends longitudinally between the first and second ends and also extends between the opposite minor sides. The component can include a linkage arrangement that couples the aerial enclosure unit to the aerial strand. The linkage arrangement having a first operating state in which the housing is positioned adjacent to and directly beneath the aerial strand with the major sides oriented generally horizontally and a second operating state in which the housing is spaced a sufficient distance from the aerial strand to permit the first and second housing pieces to be pivoted from the closed configuration to the open configuration without interference from the aerial strand.

8 Claims, 6 Drawing Sheets

(56) References Cited

U.S. PATENT DOCUMENTS

| | | | | |
|---|---|---|---|---|
| 2,524,916 | A | | 10/1950 | Loos |
| 4,570,884 | A | | 2/1986 | Armbruster |
| 4,721,830 | A | | 1/1988 | Dagan et al. |
| 4,994,630 | A | | 2/1991 | Schilling |
| 5,133,039 | A | | 7/1992 | Dixit |
| 5,668,911 | A | * | 9/1997 | Debortoli .............. G02B 6/4446 385/135 |
| 5,886,300 | A | | 3/1999 | Strickler |
| 7,048,490 | B2 | | 5/2006 | Henderson |
| 7,566,170 | B2 | | 7/2009 | Halsmer et al. |
| 7,660,508 | B2 | * | 2/2010 | Mures .................... G02B 6/445 385/135 |
| 2004/0261264 | A1 | * | 12/2004 | Swindell ................ G02B 6/483 29/868 |

OTHER PUBLICATIONS

"AIR FOSC, Aerial Fiber Optic Splice Closure," TE Connectivity, www.te.com/TelecomNetworks, Sep. 2013, 4 pp.

AIR FOSC B, Aerial In-Line Re-Enterable Fiber Optic Splice Closure, Tyco Electronics, 1999, 8 pp.

"Cable Lashing Clamp," TVO Communications, Retrieved Date: Dec. 17, 2010, From URL: http://www.tvcinc.com/hardware/cable-shasing-clamp/, 1 pg.

"Fiber Optic Splice Closures Mounting Hardware," Tyco Electronics, F616, Nov. 2007, 1 pp.

"FOSC 400 Ordering Guide for Closures and Accessories," 32 pp. (Admitted prior art.).

"FOSC 450 Gel-Sealed Fiber Optic Splice Closure Ordering Guide," Tyco Electronics Corporation, © 2004-2009 F429. Nov. 2009, 3 pp.

Exhibit A, FOSC 400B Closure with Pole Mount Kit, 2 pp. (Admitted prior art.).

Exhibit B, FOSC 400B Closure with Strand Mount Kit 2 pp. (Admitted prior art.).

Notification Concerning Transmittal International Preliminary Report on Patentability in Corresponding PCT Application No. PCT/US2012/020431 mailed Jul. 18, 2013, 10 pp.

Notification of Transmittal of the International Search Report and the Written Opinion of the International Searching Authority, or the Declaration in corresponding PCT Application No. PCT/US2012/020431 mailed Apr. 16, 2013; 12 pp.

* cited by examiner

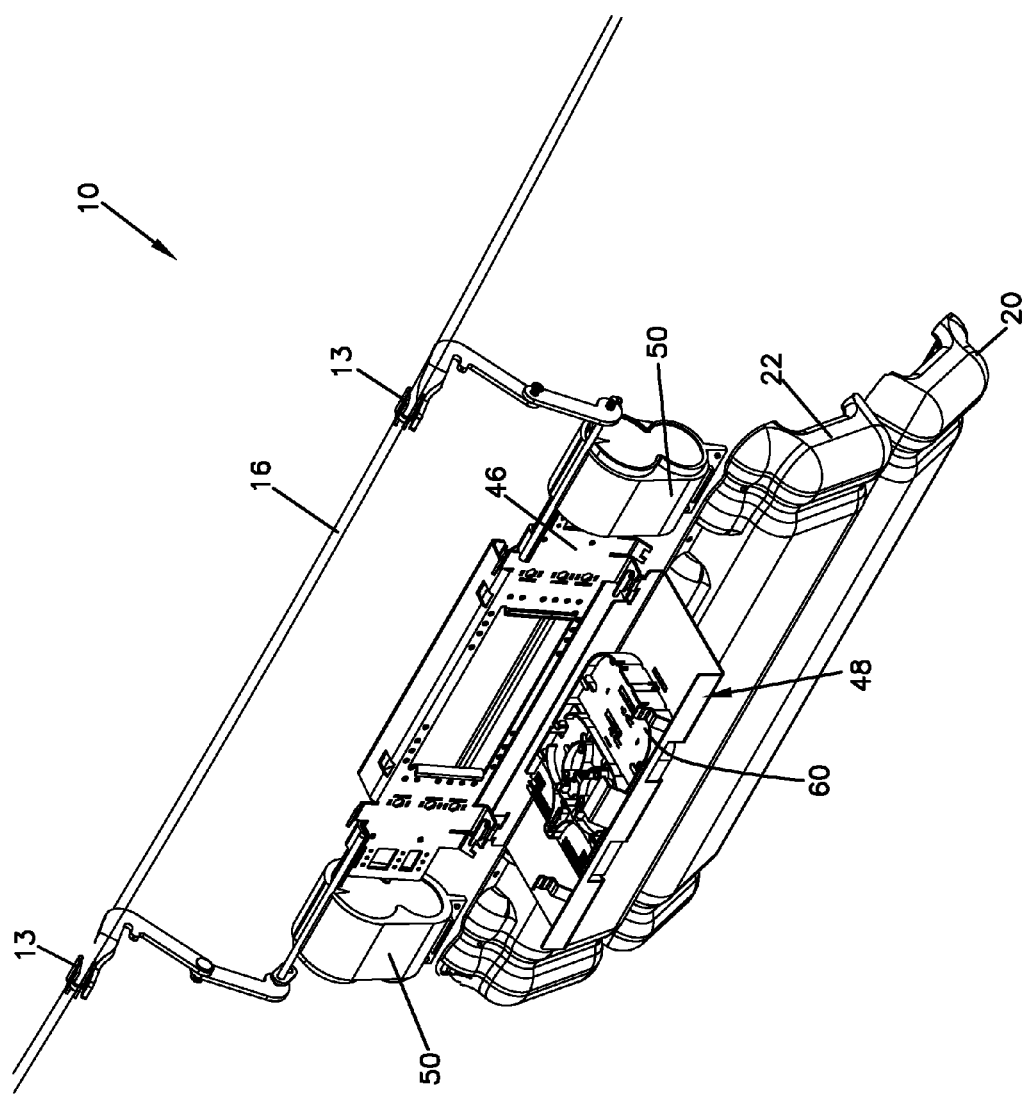

ENCLOSURE HANGER ASSEMBLY AND CABLE MANAGEMENT SYSTEM

CROSS REFERENCE TO RELATED APPLICATION

This application claims the benefit of provisional application Ser. No. 62/031,244, filed Jul. 31, 2014, which is incorporated herein by reference in its entirety.

TECHNICAL FIELD

The present disclosure relates generally to supports for cable enclosures.

BACKGROUND

It is often necessary or desirable to provide splices in aerial telecommunication and CATV cables and splice enclosures mounted adjacent the cables to protect the splices. Typically, one or a bundle of aerial telecommunication cables are lashed to a messenger strand or cable that spans and is anchored to spaced apart supports such as telephone or utility poles. While devices and systems are known for hanging or securing a splice enclosure to a messenger strand, such devices and systems tend to have multiple components that must be attached and aligned independently, and which may also present many loose parts that can be lost when in the air installing the device.

SUMMARY

Teachings of the present disclosure relate to an aerial arrangement that allow for minimal spacing below the messenger strand or cable while in a stored position. The arrangement can be pivoted to allow for full access to the front and back of the enclosure when needed. The aerial arrangement may change orientations when moved from a first position to a second position.

One aspect of the present disclosure relates to component adapted to be secured to an aerial strand which provides support for aerial cables. The component can include an aerial enclosure unit including a housing having first and second housing pieces. The housing can be elongated along a central axis that extends between opposite first and second ends of the housing. The first housing piece can be pivotally moveable relative to the second housing piece about a hinge pivot axis between an open configuration and a closed configuration. The hinge axis can be oriented to extend along the central axis. The housing can have opposite minor sides that extend longitudinally between the first and second ends. The housing can also have opposite major sides that extend longitudinally between the first and second ends and also extend between the opposite minor sides. The component can include a linkage arrangement that couples the aerial enclosure unit to the aerial strand. The linkage arrangement can have a first operating state in which the housing is positioned adjacent to and directly beneath the aerial strand with the major sides oriented generally horizontally. The linkage arrangement can also have a second operating state in which the housing is spaced a sufficient distance from the aerial strand to permit the first and second housing pieces to be pivoted from the closed configuration to the open configuration without interference from the aerial strand. The major sides of the housing can be oriented generally vertically when the linkage arrangement is in the second operating state.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 6 is a perspective view of the aerial enclosure of FIG. 5 with the second housing piece opened to allow full access to the front and back of the frame.

DETAILED DESCRIPTION

Figure 1:
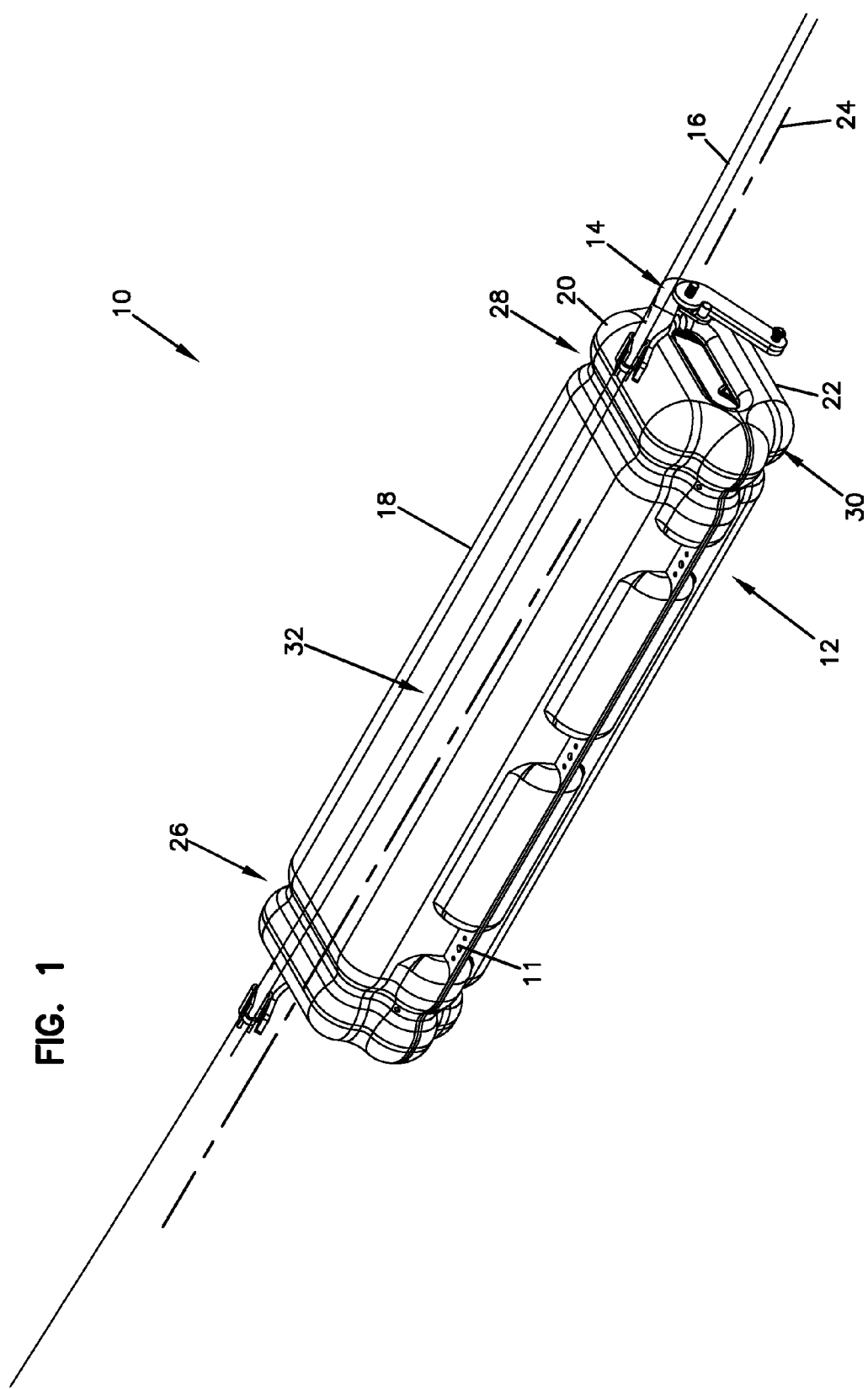
FIG. 1 is a top perspective view of an aerial arrangement including an enclosure and a hanger assembly in a raised position in accordance with the principles of the present disclosure.

FIG. 1 illustrates an aerial arrangement 10 (e.g., component) including an enclosure 12 (e.g., aerial enclosure unit) and hanger assembly or bracket 14 (e.g., linkage arrangement) in a raised position (e.g., first position) in accordance with the principles of the present disclosure. The enclosure 12 can be mounted on the hanger assembly 14 to secure the enclosure 12 to an elongate support substrate, such as a messenger cable or aerial strand 16. The enclosure 12 may be formed of a polymeric material, for example. One or a bundle of cables (not shown) can be secured to the aerial strand 16 which provides support for the cables. In one example, one or a bundle of cables can be secured to the aerial strand 16 by a lashing wire, which may be helically wound about the bundle along the lengths of the aerial strand 16 and the bundle. The aerial strand 16 may be of any suitable construction. The strand may include only one unitary cable strand or filament or may be comprised of a plurality of strands or filaments helically tested about one another. The aerial strand 16 may be formed of any suitable material, such as steel. In some examples, the aerial strand 16 can have an outer diameter in the range of from about 0.25 to 0.5 inches.

The enclosure 12 includes a housing 18 having a first housing piece 20 and a second housing piece 22 that can each be half-pieces. The housing 18 may be formed of a molded plastic or any suitable material. In some examples, the housing 18 may be formed of a metal such as steel. The first and second housing pieces 20, 22 can be connected by a hinge 11. The housing 18 can be elongated along a central axis 24 that extends between a first end 26 of the housing 18 and an opposite second end 28 of the housing 18. In one example, the first and second housing pieces 20, 22 can each include a minor side 30 opposite from each other that extends longitudinally between the first and second ends 26, 28. In another example, the first and second housing pieces 20, 22 can each include a major side 32 that extends longitudinally between the first and second ends 26, 28 of the housing 18 and between the opposite minor sides 30.

As shown in FIG. 1, the major sides 32 of the housing 18 can be oriented horizontally to the aerial strand 16 when in the raised position and the minor sides 30 of the housing 18 can be oriented vertically to the aerial strand 16 when in the raised position. While in the raised position the enclosure 12 can be positioned against the aerial strand 16 such that there is minimal distance between the enclosure 12 and the aerial strand 16 when in the first position. The hanger assembly 14 can be configured to allow the enclosure 12 to be positioned a distance below the aerial strand 16.

Figure 2:
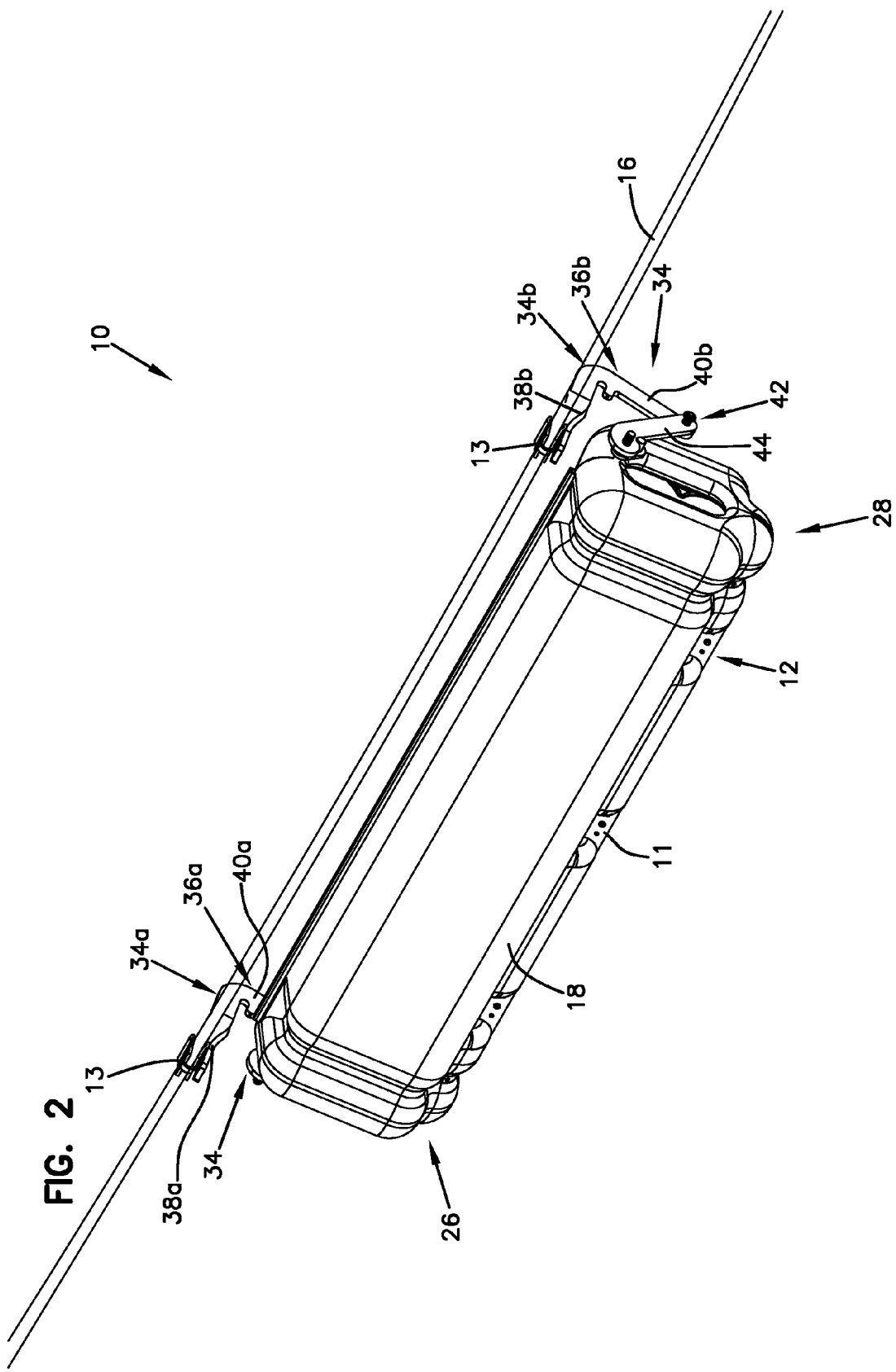
FIG. 2 is a top perspective view of the aerial enclosure of FIG. 1 in an open or pivoted or intermediate position in accordance with the principles of the present disclosure.

Referring to FIG. 2, the aerial arrangement 10 is shown in an intermediate position. In one example, the hanger assembly 14 includes a linkage arrangement 34 that includes a first linkage 34a and a second linkage 34b positioned respectively at the first and second ends 26, 28 of the housing 18. The first and second linkages 34a, 34b each include an L-shaped link 36a, 36b having a first leg 38a, 38b clamped to the aerial strand 16 and a second leg 40a, 40b pivotally connected to a first end 42 of pivot links 44a, 44b.

In one example, the linkage arrangement 34 couples the enclosure 12 to the aerial strand 16 by an attachment device 13 such as, but limited to, clamps, zip ties, or nuts. It will be appreciated that other types of fastening or coupling devices may be used. The linkage arrangement 34 can include a first operating state (see FIG. 1) in which the first and second linkages 34a, 34b are in a retracted position such that the enclosure 12 is positioned adjacent to and directly beneath the aerial strand 16 with the major sides 32 being oriented generally horizontally.

Figure 3:
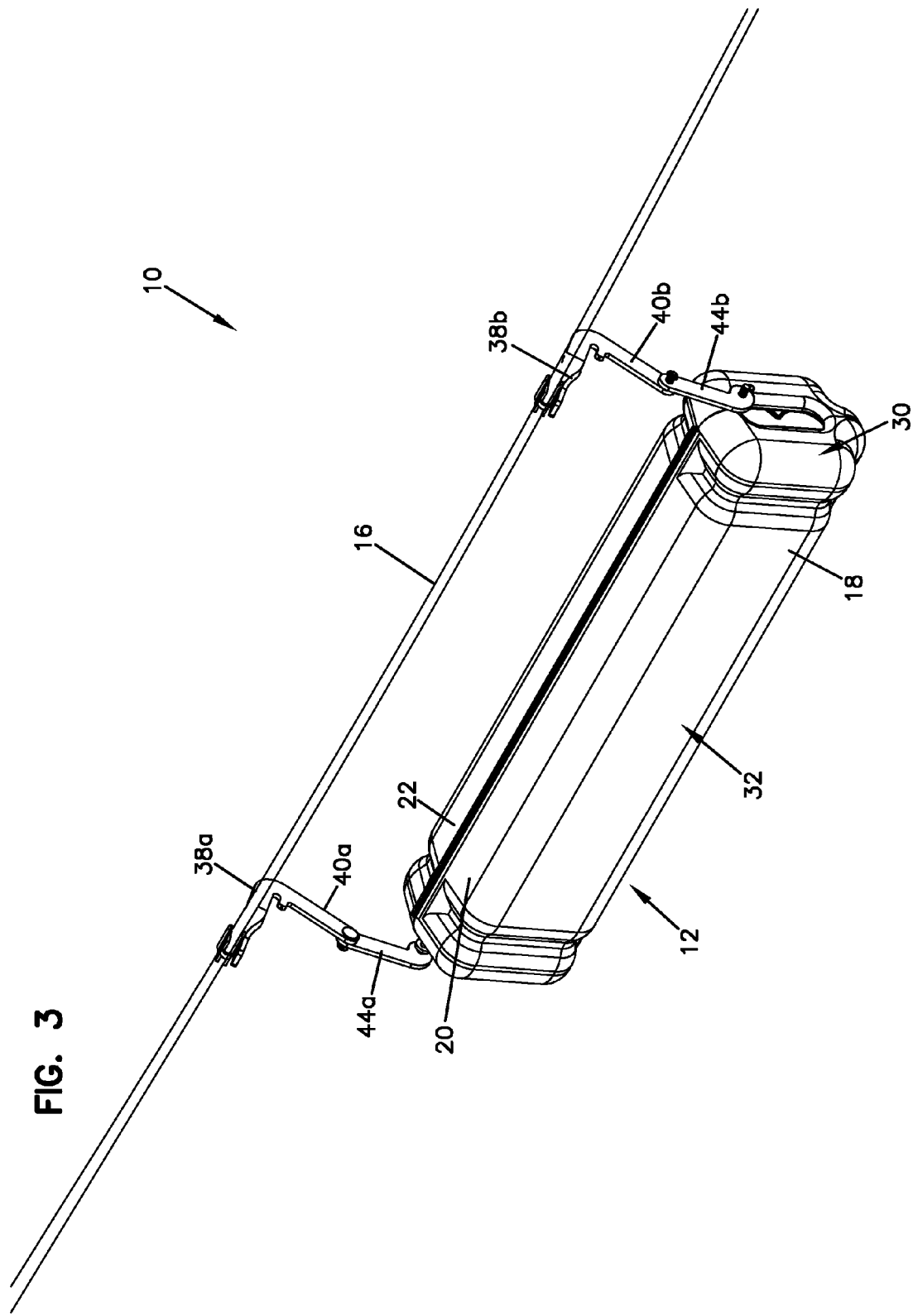
FIG. 3 is a perspective view of the aerial enclosure of FIG. 1 in a lowered position in accordance with the principles of the present disclosure.

In other examples, the enclosure 12 can be transitioned from the raised position shown in FIG. 1 to a lowered position (see FIG. 3) by pivoting the first and second linkages 34a, 34b between the retracted position and an extended position (see FIG. 3). FIG. 2 displays the start of the transition of the enclosure 12 from the raised position to the lowered position. As shown in FIG. 2, the orientation of the housing 18 can change when moving from the raised position to the lowered position. For example, the major sides 32 of the first and second housing pieces 20, 22 can transition from being oriented generally horizontally to the aerial strand 16 to being oriented generally vertically to the aerial strand 16 (see FIG. 3).

Referring to FIG. 3, the linkage arrangement 34 can include a second operating state in which the first and second linkages 34a, 34b are in an extended position such that the enclosure 12 is spaced a sufficient distance from the aerial strand 16. The distance can help to permit the first and second housing pieces 20, 22 to be pivoted from a closed configuration to an open configuration (see FIG. 4) without interference with the aerial strand 16. In one example, the first housing piece 20 can be pivotally moveable relative to the second housing piece 22 about a hinge pivot axis 15 between the open configuration and the closed configuration. The hinge pivot axis 15 can be oriented to extend along the central axis 24. As described above, the major sides 32 of the enclosure 12 can be oriented generally vertically when the linkage arrangement 34 is in the second operating state.

Figure 4:
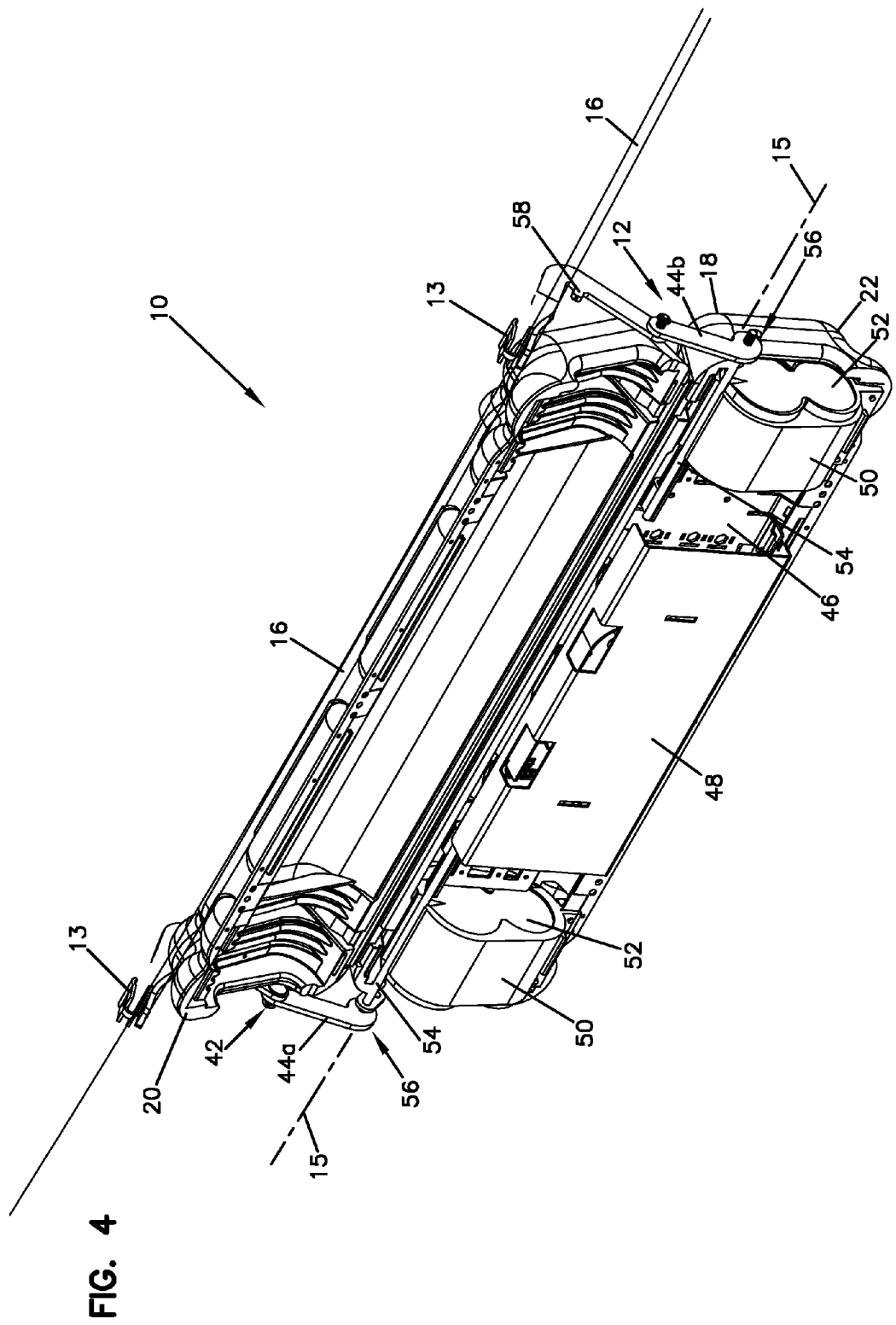
FIG. 4 is a perspective view of the aerial enclosure of FIG. 1 in the lowered position with a first housing piece opened showing a tray mounted to a frame of the enclosure in accordance with the principles of the present disclosure.

Referring to FIG. 4, the enclosure 12 can include a frame 46 contained within the housing 18. The frame 46 can have a splicing unit 48 attached to the frame 46 in which one or more cables may extend into and out from the enclosure 12. The cables may be any suitable type of cable. In one example, the cables are data transmission cables. In another example, the cables are fiber optic telecommunication cables. In other examples, the cables are copper telecommunication cables. In still other examples, the cables are telephone and/or CATV cables.

The housing 18 can include end pieces 50 at the first and second ends 26, 28 of the housing 18. In one example, the end pieces 50 can be coupled to the frame 46. The end pieces 50 can define cable pass-through openings 52 for the cables to extend into and out of the enclosure 12. In certain examples, the end pieces 50 can include a sealing construction for forming seals about the cables routed through the cable pass-through openings 52. In some examples, the end pieces 50 can be gel end pieces.

In other examples, a rod structure 54 can be coupled to the frame 46. The rod structure 54 can be generally parallel to the hinge pivot axis 15. The pivot links 44a, 44b can each include a second end 56 that can be pivotally connected to the rod structure 54. The L-shaped links 36a, 36b can each define notches 58 that receive the rod structure 54 when the linkage arrangement 34 is in the first operating state so as to provide a positive stop for retaining the linkage arrangement 34 in the first operating state.

Figure 5:
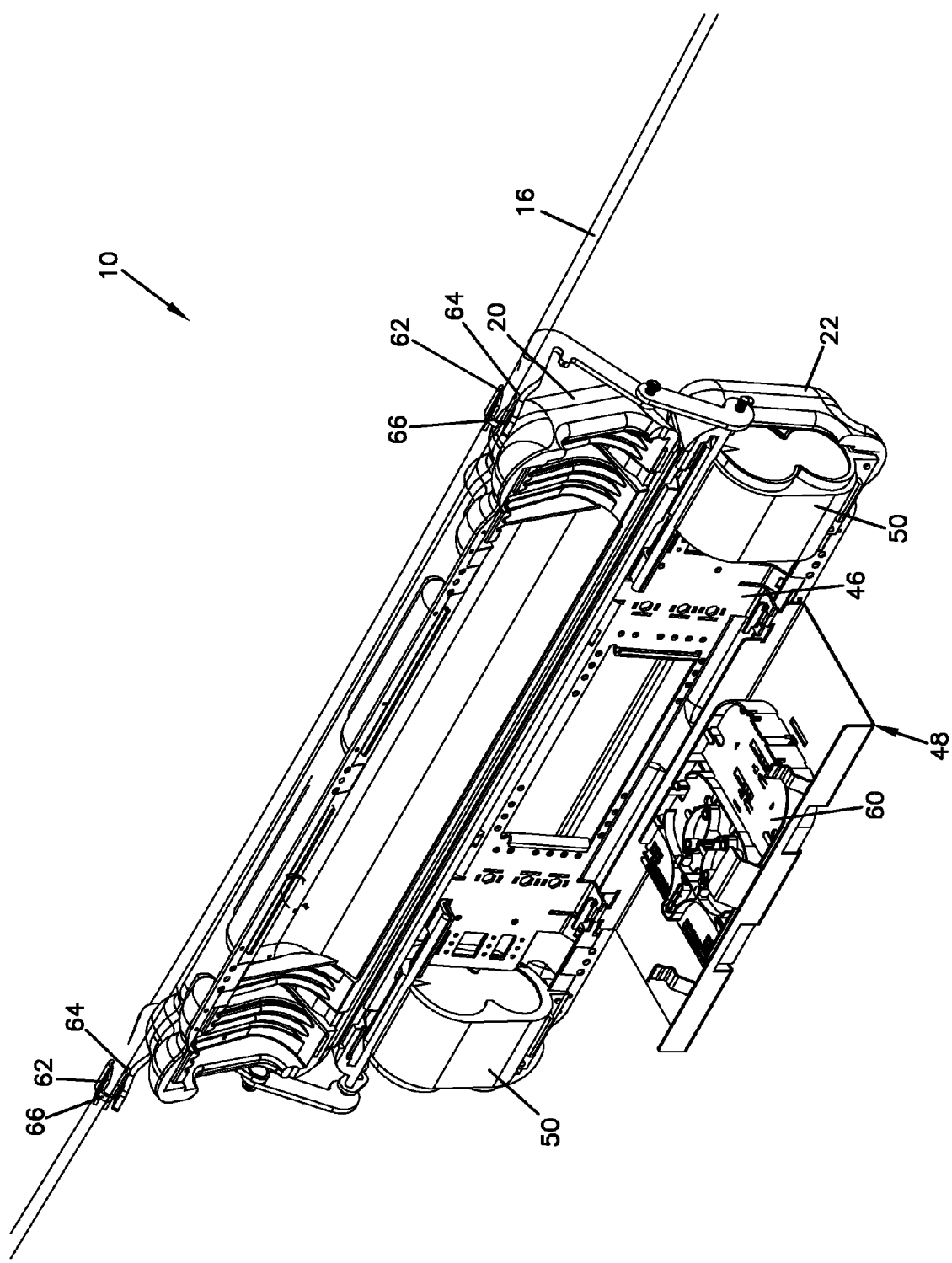
FIG. 5 is a perspective view of the aerial enclosure of FIG. 4 with the tray opened.

Referring to FIG. 5, the splicing unit 48 is shown in an open position. The splicing unit 48 can include a dual sided splice tray 60 (e.g., gadget tray) that pivots down. In certain examples, the splicing unit 48 can include a single tray or a stack of trays that may be used for holding splices. In one example, the splicing unit 48 can include passive devices such as, but not limited to, splitters and WDMs. In other examples, the enclosure 12 may expel water through drain holes or openings. In certain examples, the attachment device 13 may include a pair of opposed clamp plates 62, 64 connected by a hinge member 66. Each attachment device 13 enables the respective associated linkage 34a, 34b to be coupled to the aerial strand 16.

Referring to FIG. 6, the linkage arrangement 34 is shown in the second operating state with both the first and second housing pieces 20, 22 opened. As shown, the first and second housing pieces 20, 22 are removable from the frame 46. This configuration allows for full access to the front and back of the frame 46 when needed. The major sides 32 of the first and second housing pieces 20, 22 are oriented generally vertically to the aerial strand 16. In one example, there may be 0 to 16 drop cables up to 8 per side of the frame 46 with minimal cable movement therein.

From the forgoing detailed description, it will be evident that modifications and variations can be made without departing from the spirit and scope of the disclosure.

What is claimed is:

1. A component adapted to be secured to an aerial strand which provides support for aerial cables, the component comprising:

an aerial enclosure unit including a housing having first and second housing pieces, the housing being elongated along a central axis that extends between opposite first and second ends of the housing, the first housing piece being pivotally moveable relative to the second housing piece about a hinge pivot axis between an open configuration and a closed configuration, the hinge axis being oriented to extend along the central axis, the housing having opposite minor sides that extend longitudinally between the first and second ends, the housing also having opposite major sides that extend longitudinally between the first and second ends and also extend between the opposite minor sides; and a linkage arrangement that couples the aerial enclosure unit to the aerial strand, the linkage arrangement having a first operating state in which the housing is positioned adjacent to and directly beneath the aerial strand with the major sides oriented generally horizontally, the linkage arrangement also having a second operating state in which the housing is spaced a sufficient distance from the aerial strand to permit the first and second housing pieces to be pivoted from the closed configuration to the open configuration without interference from the aerial strand, the major sides of the housing being oriented generally vertically when the linkage arrangement is in the second operating state.

2. The component of claim 1, wherein the aerial enclosure includes a frame contained within the housing, and wherein the housing includes end pieces at the first and second ends of the housing, the end pieces being coupled to the frame and defining cable pass-through openings, the end pieces also including a sealing construction for forming seals about cables routed through the cable pass-through openings.

3. The component of claim 1, wherein the first and second housing pieces each define one of the major sides of the housing.

4. The component of claim 2, further comprising a rod structure coupled to the frame, the rod structure being generally parallel to the hinge pivot axis.

5. The component of claim 4, wherein the linkage arrangement includes first and second linkages positioned respectively at the first and second ends of the housing, the first and second linkages each including an L-shaped link having a first leg clamped to the aerial strand and a second leg pivotally connected to a first end of a pivot link, the pivot link also having a second end pivotally connected to the rod structure.

6. The component of claim 2, wherein the first and second housing pieces are removable from the frame.

7. The component of claim 1, wherein the first and second housing pieces are each half-pieces.

8. The component of claim 5, wherein the L-shaped links define notches that receive the rod structure when the linkage arrangement is in the first operating state so as to provide a positive stop for retaining the linkage arrangement in the first operating state.

* * * * *